(12) United States Patent
Shim et al.

(10) Patent No.: US 8,423,049 B2
(45) Date of Patent: Apr. 16, 2013

(54) MOBILE COMMUNICATION TERMINAL AND METHOD OF CONTROLLING VOLUME THEREOF

(75) Inventors: Jin Sun Shim, Gyeonggi-do (KR); Su Yeon Hwang, Gyeonggi-do (KR); Jin Hyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 946 days.

(21) Appl. No.: 12/030,770

(22) Filed: Feb. 13, 2008

(65) Prior Publication Data

US 2008/0261579 A1    Oct. 23, 2008

(30) Foreign Application Priority Data

Apr. 18, 2007    (KR) .................... 10-2007-0037873

(51) Int. Cl.
*H04W 24/00*    (2009.01)
*H04M 3/42*    (2006.01)

(52) U.S. Cl.
USPC ...................... 455/456.4; 455/416

(58) Field of Classification Search ............... 455/550.1, 455/116, 156.1, 221, 355, 456.4, 219, 220
See application file for complete search history.

(56) References Cited

U.S. PATENT DOCUMENTS

| | | | |
|---|---|---|---|
| 6,018,671 A * | 1/2000 | Bremer | 455/567 |
| 2004/0192368 A1* | 9/2004 | Edwards et al. | 455/521 |
| 2004/0224717 A1* | 11/2004 | Hertzberg et al. | 455/550.1 |
| 2005/0064913 A1* | 3/2005 | Kim | 455/567 |
| 2005/0191969 A1* | 9/2005 | Mousseau | 455/90.2 |
| 2007/0161412 A1* | 7/2007 | Nevid et al. | 455/567 |
| 2008/0074488 A1* | 3/2008 | Thompson | 348/14.08 |

* cited by examiner

*Primary Examiner* — Temica M Beamer
*Assistant Examiner* — Joel Ajayi
(74) *Attorney, Agent, or Firm* — Lee, Hong, Degerman, Kang & Waimey

(57) ABSTRACT

A mobile communication terminal and method of controlling a volume thereof are disclosed, by which the volume of the mobile communication terminal can be controlled in case of entering a specific mode while a manner mode is set. The present invention includes entering a specific mode for outputting an audio signal while a manner mode is set, selecting a presence or non-presence of an output of the audio signal, and terminating the specific mode, wherein the manner mode is maintained in case of terminating the specific mode.

14 Claims, 5 Drawing Sheets

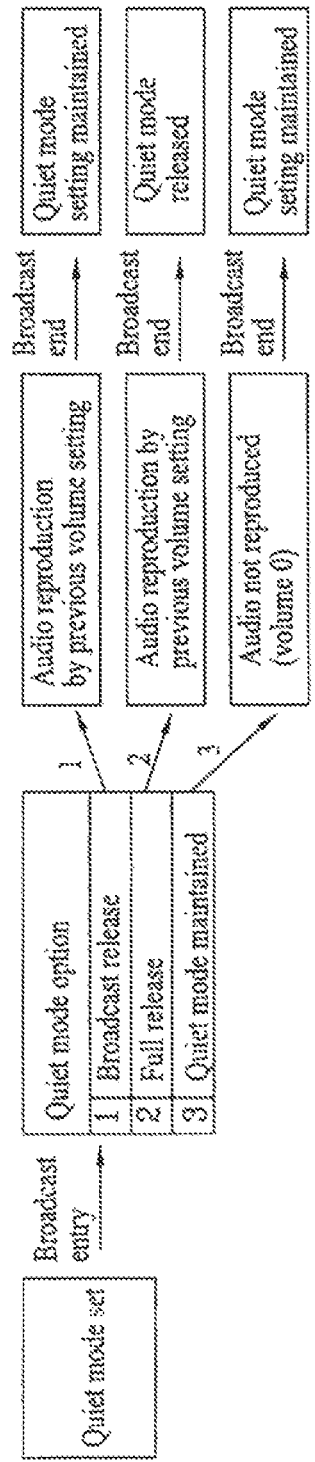

MOBILE COMMUNICATION TERMINAL AND METHOD OF CONTROLLING VOLUME THEREOF

CROSS-REFERENCE TO RELATED APPLICATIONS

Pursuant to 35 U.S.C. §119(a), this application claims the benefit of earlier filing date and right of priority to Korean Application No. 10-2007-0037873, filed on Apr. 18, 2007, the contents of which are hereby incorporated by reference herein in its entirety.

BACKGROUND OF THE INVENTION

1. Field of the Invention

The present invention relates to a mobile communication terminal, and more particularly, to a mobile communication terminal and method of controlling a volume thereof.

2. Discussion of the Related Art

Generally, a mobile communication terminal moves around within a mobile communication service area to provide a method of communication with other communication terminals.

The mobile communication terminal is provided with a function for setting a quiet mode. For example, a quiet mode may provide notification of various events through a method that is different from outputting an audio signal.

The related art mobile communication terminal indiscriminately sets the volume of an audio signal to zero when a quiet mode is set on the mobile communication terminal. Thus, the related art mobile communication terminal is unable to control the audio signal volume when the quiet mode is set.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method of controlling a volume in a mobile communication terminal includes enabling a specific mode which outputs an audio signal while the mobile communication terminal is in a quiet mode, enabling or disabling output of the audio signal, and terminating the specific mode, wherein the mobile communication terminal remains in the quiet mode after the specific mode has been terminated In accordance with an embodiment, a method of controlling a volume in a mobile communication terminal includes enabling a specific mode which outputs an audio signal while the mobile communication terminal is in a quiet mode, enabling or disabling output of the audio signal, and terminating the specific mode, wherein the mobile communication terminal remains in the quiet mode after the specific mode has been terminated.

In one feature, the specific mode includes at least one of a broadcast play mode, a music play mode, a moving picture player mode, a bell sound setting mode, a sound effect generating mode, a time alarming mode, and a game mode. In another feature, the method for enabling or disabling output of the audio signal includes displaying an interface for enabling or disabling output of the audio signal after the specific mode is enabled. In yet another feature an initial volume of the audio signal is a previous setting of an audio signal volume or a preset volume when the output of the audio signal is enabled.

In one embodiment, a method of controlling a volume in a mobile communication terminal, includes enabling a specific mode such that an audio signal is output while the mobile communication terminal is in a quiet mode, selecting a quiet mode option, wherein the quiet mode option comprises one of fully disabling the quiet mode, partially disabling the quiet mode, and maintaining the quiet mode, controlling the volume of the audio signal according to on the quiet mode option, and terminating the specific mode, wherein the quiet mode is controlled according to the quiet mode option selected.

In accordance to another embodiment, a mobile communication terminal includes an input unit for enabling a specific mode and enabling or disabling an output of an audio signal when the specific mode is enabled, a control unit, for receiving an input signal from the input unit while a quiet mode is enabled, and controlling an interface for enabling or disabling the output of the audio signal and controlling the state of the quiet mode after the specific mode has been terminated, a display unit displaying an interface for enabling or disabling the output of the audio signal in response to a control command of the control unit, an audio output unit outputting the audio signal if the output of the audio signal is enabled.

In accordance to yet another embodiment, a mobile communication terminal includes an input unit for enabling a specific mode and selecting a quiet mode option, wherein the quiet mode option comprises one of fully disabling a quiet mode, partially disabling the quiet mode, and maintaining the quiet mode if the specific mode is enabled, a control unit, for receiving an input signal from the input unit while a quiet mode is enabled and controlling a volume of an audio signal according to the quiet mode option, and an audio output unit outputting the audio signal if the quiet mode is fully disabled or partially disabled when the specific mode is enabled.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein:

FIG. 5 is a block diagram of a concept for one embodiment of the mobile communication terminal volume controlling method shown in FIG. 4.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile communication terminal and method of controlling a volume thereof are explained with reference to the attached drawings as follows.

Figure 1:
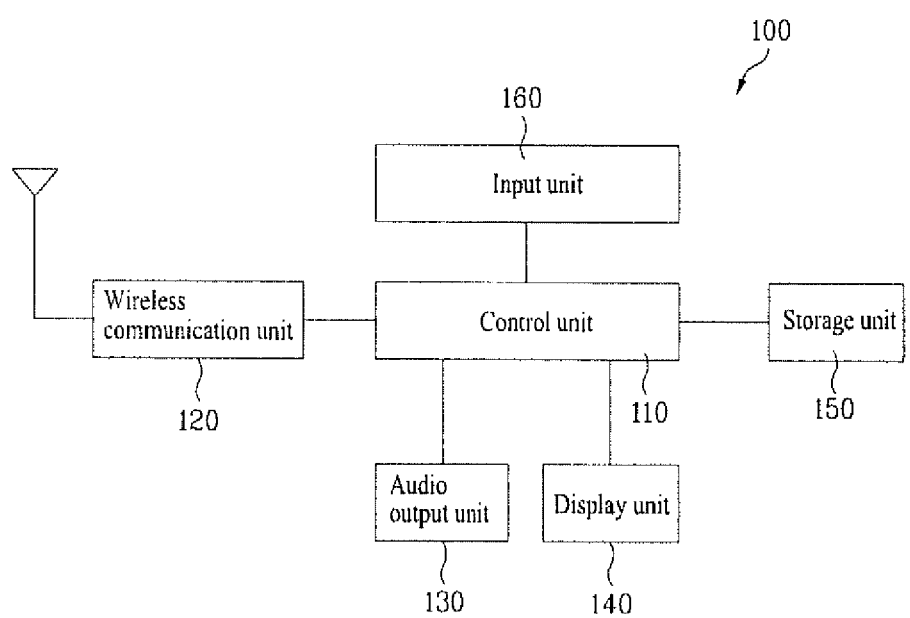
FIG. 1 is a block diagram of a mobile communication terminal according to one embodiment of the present invention.

FIG. 1 is a block diagram of a mobile communication terminal according to one embodiment of the present invention.

Referring to FIG. 1, a mobile communication terminal 100 may include a control unit 110, a wireless communication unit 120, an audio output unit 130, a display unit 140, a storage unit 150, and an input unit 160.

The term, 'quiet mode' means a mode for notifying a user of various events of the mobile communication terminal via a means different from an audio output during circumstances that require silence. For example, an audio output may be replaced by a vibration or a flickering of a light to notify a user of an event.

The input unit 160 may include, for example a keypad, a touch pad, or a touchscreen. In particular, if the input unit 160 includes a touchscreen, a user may manipulate the input unit 160 by touching the display unit 140. In one embodiment, an input unit 160 may include a hot key for facilitation of key signal manipulation According to one embodiment of the present invention, for the convenience of enabling or disabling the output of the audio signal, a control unit 110 may display, on a display unit 140, an item for enabling or disabling an output of an audio signal after a specific mode is enabled. This will be explained in detail with reference to FIG. 4.

Figure 2:
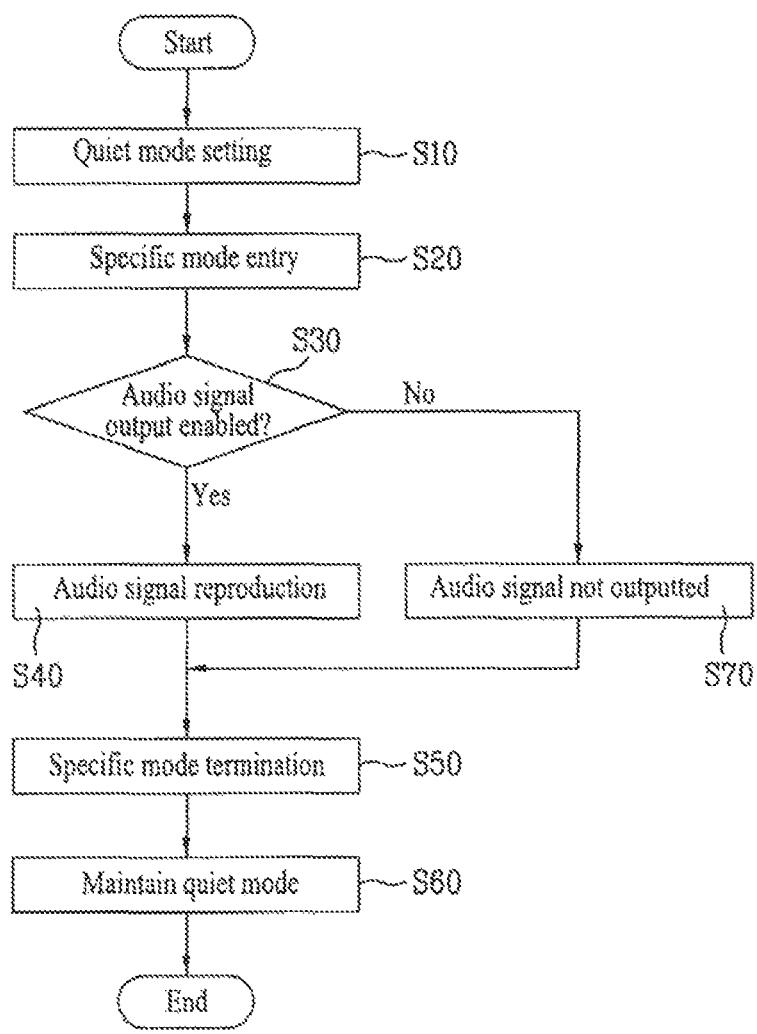
FIG. 2 is a flowchart of a method of controlling volume in a mobile communication terminal according to one embodiment of the present invention.

FIG. 2 is a flowchart of a method of controlling a volume in a mobile communication terminal 100 according to one embodiment of the present invention.

A mobile communication terminal 100 is able to enter a specific mode while a quiet mode is set. Block S10 controls the quiet mode setting and block S20 enters a specific mode. Block S30 determines whether an audio signal output has been selected. Block S40 reproduces an audio signal and block S70 does not output an audio signal. Block S50 terminates the specific mode. Block S60 determines whether to maintain the quiet mode.

The term "specific mode" means a mode for performing a specific function while an audio signal is reproduced.

If desired, a specific mode may be enabled after the quiet mode is enabled in a mobile communication terminal.

A specific mode may be selected by manipulating input unit 160. Examples of a specific mode are: a broadcast play mode, a music play mode, a moving picture player mode, a bell sound setting mode, a sound effect generating mode, a time alarming mode, and a game mode An audio signal may be reproduced in various ways while the specific mode is set. For example, in one embodiment, while the specific mode is set to a broadcast play mode, a broadcast signal received via the wireless communication unit 120 is decoded to reproduce an audio signal. In this embodiment, audio data included in the broadcast signal may be output via the audio output unit 130.

In an alternate embodiment, a specific mode may be set to a moving picture/bell sound play mode, wherein an audio signal may be reproduced by outputting a moving picture and a bell sound stored in the storage unit 150. The moving picture or bell sound includes audio data that may be output via the audio output unit 130.

If a specific mode is enabled while a quiet mode is set, the user may be able to enable or disable an output of an audio signal (S30). In one embodiment, enabling or disabling the output of an audio signal means a selection for whether or not to reproduce an audio signal during the execution of an event in a specific mode. The selection to enable or disable may be performed through a key manipulation of the input unit 160.

If the output of an audio signal is selected in step S30, control unit 110 may reproduce an audio signal while a specific mode is executed (S40). The audio signal may be reproduced via the audio output unit 130. The volume of the audio signal may be the most recent volume setting used by the audio output unit 130 or a preset audio signal volume. When the specific mode ends via the step S50, the control unit 110 may maintain the quiet mode status (S60).

If an output of an audio signal is not selected in step S30, control unit 110 may execute a specific mode without reproducing an audio signal (S70).

The control unit 110 may maintain the quiet mode status (S60) when specific mode ends via the step (S50).

A method of controlling a volume of a mobile communication terminal when a broadcast mode is enabled is explained as follows.

Figure 3:
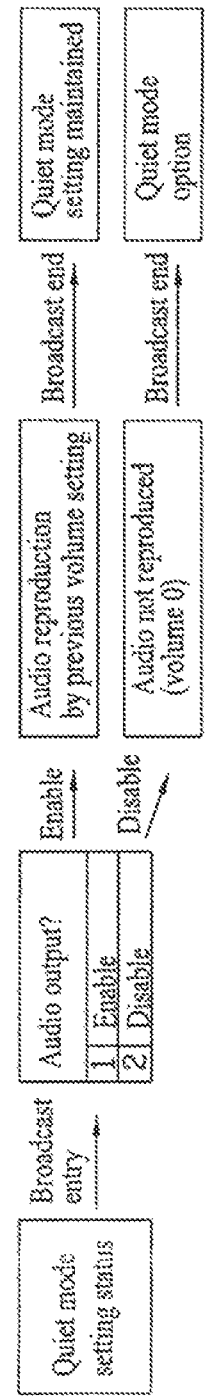
FIG. 3 is a block diagram of a concept for one embodiment of the mobile communication terminal volume controlling method shown in FIG. 2.

FIG. 3 shows an example of the method shown in FIG. 2, and more particularly, a method of controlling a volume in a mobile communication terminal when a broadcast mode is enabled.

If desired, when a broadcast mode is enabled while a quiet mode is set, an interface for enabling or disabling an audio reproduction may be displayed. If an output of an audio signal is enabled, the quiet mode is temporarily disabled, such that a broadcast is reproduced while an audio signal is output in correspondence to a previous volume setting. When the broadcast is terminated, the mobile communication terminal may remain in a quiet mode.

Alternatively, if a broadcast mode is disabled, audio reproduction is disabled and the mobile communication terminal remains in a quiet mode. However, video signal reproduction may still be carried out via the display unit 140 even if the broadcast mode is disabled. As described above, when a broadcast is terminated, the mobile communication terminal 100 may remain in a quiet mode.

Figure 4:
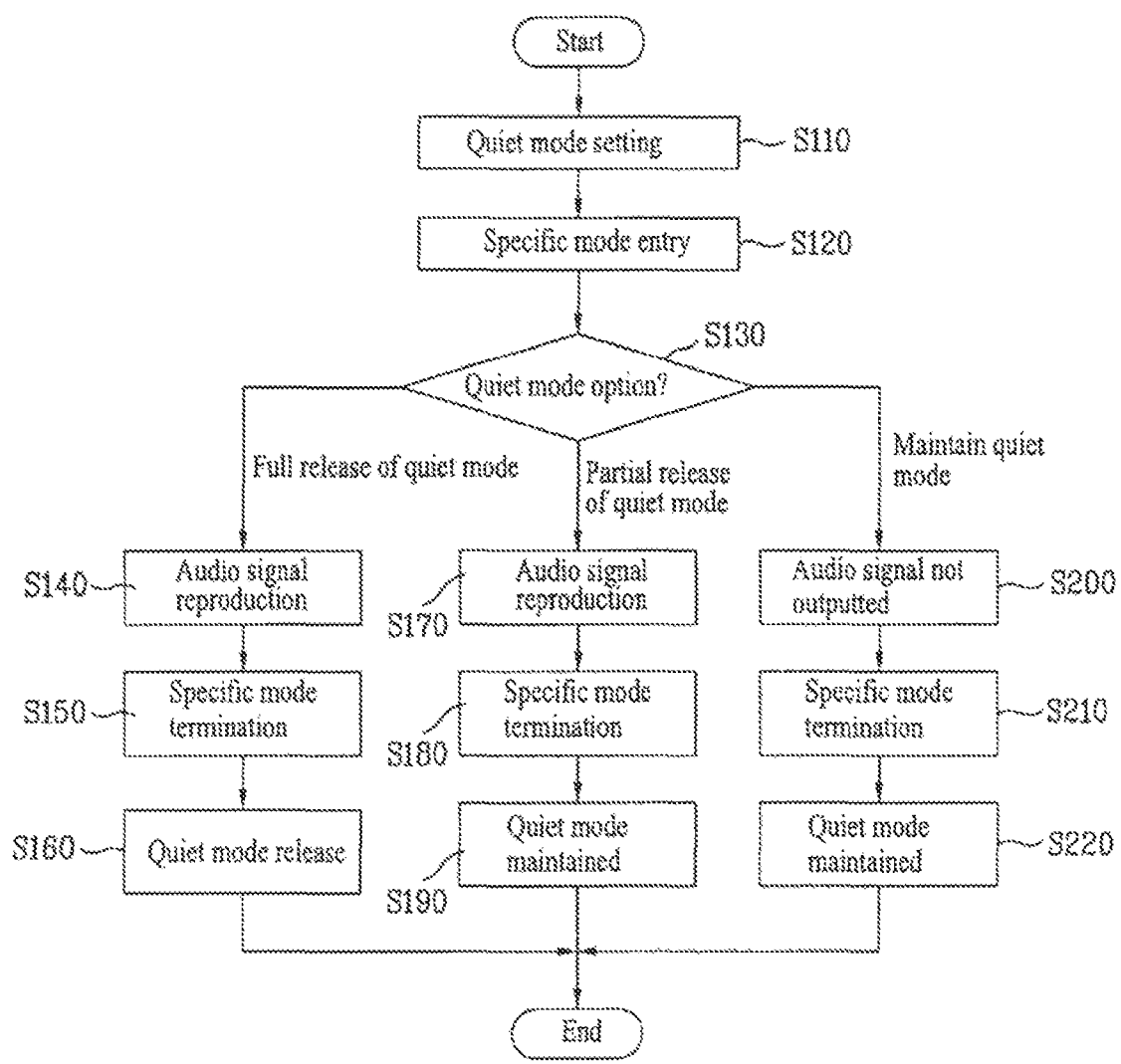
FIG. 4 is a flowchart of a method of controlling volume in a mobile communication terminal according to another embodiment of the present invention.

FIG. 4 is a flowchart of a method of controlling a volume in a mobile communication terminal 100 according to another embodiment of the present invention. Parts overlapped with those of the description for FIG. 2 are omitted in the following description.

Referring to FIG. 4, the mobile communication terminal 100 is able to enter a specific mode while a quiet mode is set (S110, S120). Step S130 determines whether the quiet mode is disabled, partially disabled, or maintained.

If the "full release" mode is determined (S130) an audio signal is reproduced (S140), the specific mode is terminated (S150), and the quiet mode is terminated (S160).

If the "partial release" mode is determined (S130), an audio signal is reproduced (S170), the specific mode is executed (S180), and the quiet mode is maintained (S190).

If the "maintain quiet mode" mode is determined (S130), no audio signal is reproduced (S200), the specific mode is executed (S210), and the quiet mode is maintained (S220).

If a specific mode is entered while the quiet mode is set, the mobile communication terminal 100 may disable the quiet mode to output an audio signal. According to one embodiment of the present invention, a user may disable a quiet mode, partially disable a quiet mode while the specific mode is executed, or maintain a quiet mode while the specific mode is executed.

If desired, control unit 110 may display on a display unit 140 an interface for selecting whether to fully disable a quiet mode, partially disable a quiet mode, and maintain a quiet mode. This will be explained with reference to FIG. 5 later.

If the quiet mode is fully disabled in step S130, the control unit 110 may reproduce an audio signal while the specific mode is executed (S140). The audio signal reproduction may be performed via the audio output unit 130. The volume of the audio signal may be the most recent volume setting used by the audio output unit 130 or a preset audio signal volume. In this embodiment, the control unit 110 may release the quiet mode (S160) when a specific mode ends via step S150.

If the quiet mode is partially disabled in step S130, the control unit 110 may reproduce an audio signal by partially disabling the quiet mode while executing a specific mode (S170). The audio signal reproduction may be performed via the audio output unit 130. The volume of the outputted audio signal may be the most recent volume setting used by the audio output unit 130 or a preset audio signal volume. If the specific mode ends (S180), the control unit 110 makes the mobile communication terminal 100 maintain the quiet mode (S190).

If the quiet mode is maintained in step S130, the control unit 110 maintains the quiet mode while a specific mode is executed. When the quiet mode is maintained, the control unit 110 does not reproduce an audio signal while a specific mode is executed (S200). If the specific mode ends (S210), the control unit 110 maintains the quiet mode of a mobile communication terminal 100 (S220).

A method of controlling a volume of a mobile communication terminal 100, when a broadcast mode is entered as illustrated in FIG. 4, is explained as follows.

FIG. 5 shows an example of the method shown in FIG. 4, and more particularly, a method of controlling a volume in a mobile communication terminal 100 when a broadcast mode is executed.

As illustrated in FIG. 5, when a broadcast mode is executed while a quiet mode is set, an interface for selecting a quiet mode option may be displayed. In this scenario, the selections for the quiet mode option includes "broadcast release," "full release," and "maintain quiet mode If the "broadcast release" is selected, the quiet mode is temporarily disabled while a broadcast signal is output. Therefore, a broadcast is reproduced while an audio signal is output in correspondence to the previous volume setting. Additionally, the quiet mode status is maintained when a broadcast ends.

If the "full release" is selected, the quiet mode is disabled, an audio signal may be outputted in correspondence to a previous volume setting while a broadcast is reproduced. If the broadcast ends, the quiet mode remains disabled.

If the "maintain quiet mode" is selected, an audio signal is not output while the broadcast signal is output. Additionally, the quiet mode status is maintained when a broadcast ends.

Accordingly, the present invention provides several effects or advantages. The present invention is able to manage a quiet mode by dividing the quiet mode into two categories: a quiet mode while executing a specific mode and a quiet mode while not executing a specific mode. Therefore, an audio signal is reproduced by disabling the quiet mode while the specific mode is executed. If the specific mode is terminated, the quiet mode may be automatically enabled.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a volume in a mobile terminal, the method comprising:
    enabling a quiet mode of the mobile terminal via a first input unit of the mobile terminal;
    selecting a content comprising an audio content for playback via a second input unit of the mobile terminal which is in the quiet mode, wherein the selected content is video content;
    enabling output of the audio content associated with the selected content, via a control unit of the mobile terminal, upon playback of the selected content;
    outputting the selected content and the audio content via respective output devices during the playback of the selected content;
    terminating the output of the selected content and the audio content by stopping the playback of the selected content during the quiet mode; and
    maintaining the quiet mode of the mobile terminal when the output of the selected content and the audio content is terminated,
    wherein the first input unit is a hot key designated to enable the quiet mode and the second input unit is a touch screen.

2. The method of claim 1, wherein the selected content is output during at least a broadcast play mode, a music play mode, a moving picture player mode, a bell sound setting mode, a sound effect generating mode, a time alarming mode, or a game mode.

3. The method of claim 2, wherein an initial volume of the audio signal is a previous setting of an audio signal volume or a preset volume when the output of the audio signal is enabled.

4. A method of controlling a volume in a mobile terminal, the method comprising:
    enabling a quiet mode of the mobile terminal via a first input unit of the mobile terminal;
    selecting an audio content for playback, via a second input unit of the mobile terminal, when the mobile terminal is in the quiet mode;
    enabling an output of the audio content in response to the mobile terminal detecting the selection of the audio content for playback;
    terminating the playback of the audio content during the quiet mode; and
    maintaining the quiet mode of the mobile terminal when the output of the audio content is terminated,
    wherein the first input unit is a hot key designated to enable the quiet mode and the second input unit is a touch screen.

5. The method of claim 4, wherein the audio content is output during at least one of a broadcast play mode, a music play mode, a moving picture player mode, a bell sound setting mode, a sound effect generating mode, a time alarming mode, or a game mode.

6. The method of claim 4, wherein an initial volume of the audio signal is a previous setting of an audio signal volume or a preset volume.

7. A mobile terminal comprising:
a first input unit configured to enable a quiet mode of the mobile terminal;
a second input unit configured to select a content for playback during the quiet mode, wherein the selected content is a video content comprising audio content,
wherein an output of an audio signal associated with the selected video content is enabled when the mobile terminal is in the quiet mode; and
an audio output unit configured to output the audio signal associated with the selected video content for playback during the quiet mode,
wherein the quiet mode is maintained after the video content playback is terminated, and
wherein the first input unit is a hot key designated to enable the quiet mode and the second input unit is a touch screen.

8. The mobile terminal of claim 7, wherein an initial volume of the audio signal is a previous setting of an audio signal volume or a preset volume.

9. A mobile terminal comprising:
a first input unit configured to enable a quiet mode of the mobile terminal;
a second input unit configured to select an audio content for playback when the mobile terminal is in the quiet mode;
a control unit configured to enable output of an audio signal associated with the audio content during the quiet mode in response to selecting the audio content for playback; and
an audio output unit configured to output the audio signal associated with the selected audio content during the quiet mode,
wherein the quiet mode is maintained after the audio content playback is terminated, and
wherein the first input unit is a hot key designated to enable the quiet mode and the second input unit is a touch screen.

10. The mobile terminal of claim 9, wherein an initial volume of the audio signal is a previous setting of an audio signal volume or a preset volume.

11. The mobile terminal of claim 9, wherein the audio content comprises at least a broadcast content, a moving picture content, a time alarming, or a game.

12. The method of claim 1, further comprising enabling output of only the audio content associated with the selected content via the control unit of the mobile terminal upon playback of the selected content.

13. The method of claim 1, further comprising enabling output of the audio content associated with the selected content in response to an input of the selected content.

14. The method of claim 1, wherein the selected content is output immediately after being selected via the second input unit during the quiet mode.

* * * * *